(12) United States Patent
Pellman et al.

(10) Patent No.: US 7,281,843 B1
(45) Date of Patent: Oct. 16, 2007

(54) VERTICAL AGRICULTURAL MIXER

(75) Inventors: David C. Pellman, Coleman, WI (US); Anthony H. Sailer, Pound, WI (US)

(73) Assignee: Patz Sales, Inc., Pound, WI (US)

( * ) Notice: Subject to any disclaimer, the term of this patent is extended or adjusted under 35 U.S.C. 154(b) by 408 days.

(21) Appl. No.: 11/093,442

(22) Filed: Mar. 30, 2005

Related U.S. Application Data

(60) Provisional application No. 60/604,268, filed on Aug. 25, 2004.

(51) Int. Cl.
*B01F 7/24* (2006.01)

(52) U.S. Cl. ............. 366/297; 366/307; 366/314; 366/604

(58) Field of Classification Search .......... 366/297, 366/301, 302, 305, 307, 603, 296, 295, 294, 366/293, 292; 241/101.761, 101.76, 605, 241/101.8
See application file for complete search history.

(56) References Cited

U.S. PATENT DOCUMENTS

| | | | |
|---|---|---|---|
| 6,409,377 B1 | 6/2002 | Van Der Plas | |
| 7,118,268 B2 * | 10/2006 | Van Der Plas | ............. 366/314 |

* cited by examiner

*Primary Examiner*—Tony G Soohoo
(74) *Attorney, Agent, or Firm*—Andrus, Sceales, Starke & Sawall, LLP

(57) ABSTRACT

A vertical agricultural mixer employs a pair of vertical mixing augers in combination with a pair of asymmetrical, half pyramid-shaped transfer protrusions adjacently disposed along each opposed sidewall between the augers in a mixing tub. The transfer protrusions are differently shaped with tips which are vertically spaced from each other along a vertical line on each sidewall. The transfer protrusions create a pressure gradient to allow material mixed in the tub to transfer to an adjacent mixing auger more efficiently so that mixing action is optimized and dead mixing spots are prevented.

7 Claims, 1 Drawing Sheet

VERTICAL AGRICULTURAL MIXER

CROSS REFERENCE TO RELATED APPLICATION

This application is based on and claims priority from U.S. Provisional Application Ser. No. 60/604,268 filed Aug. 25, 2004.

FIELD OF THE INVENTION

The present invention relates generally to a vertical mixing apparatus used for mixing, blending and combining animal feeds or other loose bulky agricultural or fodder material. More particularly, the invention pertains to the use of at least two vertically rotated mixing augers mounted in a material-receiving tub so as to effect an optimal, efficient mixing of agricultural material between the augers.

BACKGROUND AND SUMMARY

A vertical auger mixer typically consists of a stationary component which is generally an inverted, pyramid-shaped, oval truncated tub which has rotating augers inside used to mix animal feeds or other bulky loose material. This device using two or more vertically rotated, horizontally opposed mixing augers of a generally cone-shaped configuration, requires a somewhat half pyramid-shaped transfer protrusion attached to the tub sidewall to allow a satisfactory mixing action. This transfer protrusion is in most cases a symmetrical shape located at the center point of the sidewall of the tub perpendicular to the point where the mixing augers come nearest to contact. The transfer protrusion has a base which is concave and generally follows the contour of the vertical auger base. The transfer protrusion also has a tip which commonly terminates generally at the highest point of the auger flight. The transfer protrusions fill in the empty area or void where the augers do not contact the feed material. This void is known as a dead or inactive mixing area.

Fully or near symmetrical transfer protrusions used by most manufacturers do not provide efficient transfer of the mixed material from one auger to the next. A problem arises in that the product being mixed tends to remain (rotate) in the area of the auger where it is first located thus creating dead spots. This extends the mixing time required to fully mix the different feed ration ingredients throughout the entire batch.

It is a general object of the present invention to provide a vertical agricultural multi-auger mixer which optimizes mixing of agricultural materials by maximizing transfer of the mixed material from one auger to the next.

The invention is directed towards tub-mounted vertical mixing augers used in combination with transfer protrusions having a unique half pyramid shape, which improves the end-to-end mixing performance of a multiple vertical auger mixer. The transfer protrusion involved in this invention has a base, which is generally symmetrical in shape. The portion of the half pyramid-shaped protrusion where rotation of the vertical auger approaches rises from its base along the tub side to a tip near the top of the tub at a given angle. The side of the half pyramid-shaped protrusion which is away from the approach of the rotating vertical auger rises from the base at an angle which brings its tip to a point at a lower position on the tub sidewall. This allows material to advantageously roll or fall away from the action of the auger and the protrusion at a more rapid rate. This also allows the material to transfer to the adjacent auger more efficiently which improves the mixing action and speeds the emptying of the mixer. The key feature is to maintain or increase the pressure in the loaded output side of the auger against the protrusion, and to reduce or drop the pressure in the unloaded input side of the auger away from the protrusion while preventing dead (inactive) spots at the base of the protrusion next to the tub floor. The size and shape of the protrusion can be of a variety of shapes and sizes to accommodate different sizes and mixers while maintaining the advantages stated above.

In one aspect of the invention, a vertical agricultural mixer has a mixing tub defined by a pair of opposing end walls, first and second opposing sidewalls, a bottom wall and an open top. First and second vertical mixing augers are mounted in the mixing tub and are rotatably driven in the same direction therein for lifting and mixing agricultural materials together within the mixing tub. The invention is improved by first and second agricultural material-engaging transfer protrusions adjacently disposed along each opposed sidewall between the mixing augers and the mixing tub. The transfer protrusions have asymmetrical, upwardly tapering shapes with tips that are vertically spaced from each other and lie along a common vertical line on each side of the sidewalls to permit agricultural material to continuously and more efficiently transfer between the rotating mixing augers in order to improve mixing action in the tub.

During mixing, pressure is increased in a loaded output side of the first mixing auger against the one transfer protrusion closest thereto. Pressure is reduced in an unloaded input side of the second mixing auger away from the other transfer protrusion while preventing dead mixing spots on bottom ends of the transfer protrusions. A pressure gradient is created between the adjacently disposed first and second transfer protrusions that substantially minimizes flow of material from the first mixing auger over the second transfer protrusion on the second sidewall against a flow of material being transferred from the second mixing auger over the first transfer protrusion. The pressure gradient also substantially minimizes flow of material from the second mixing auger over the second transfer protrusion on the first sidewall against the flow of material being distributed from the first mixing auger over the first transfer protrusion.

In the preferred embodiment, a first transfer protrusion is located on the first sidewall and has a concave base following a contour of a lowest flight of the first mixing auger and rises to the tip at a given angle along a first guide surface. A second transfer protrusion on the first sidewall has a concave base following the contour of the lowest flight of the second mixing auger and rises to the tip along a second guide surface lying at a given angle which is different and less steep than the angle of the first guide surface on the first transfer protrusion. A third transfer protrusion on the second sidewall is similar to the first transfer protrusion and is located adjacent to the second mixing auger. A fourth transfer protrusion on the second sidewall is similar to the second transfer protrusion and is located adjacent to the first mixing auger. Each transfer protrusion preferably has a half pyramid shape. The common vertical line on each sidewall is coincident with a vertical plane transversely bisecting the mixing tub. The tips of the second and fourth transfer protrusions are positioned below the top ends of the vertical posts of the mixing augers.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION

Figure 3:
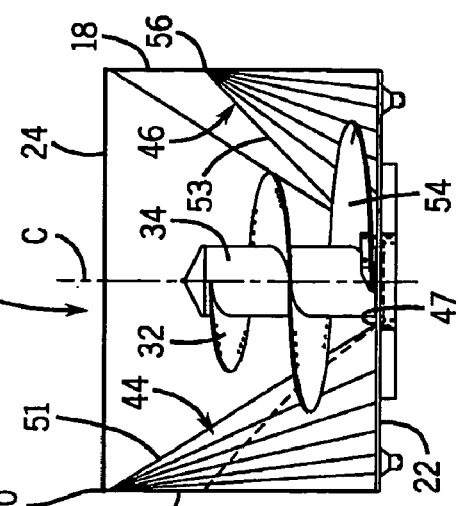
FIG. 3 is an end view taken from the right side of FIG. 2.
Figure 1:
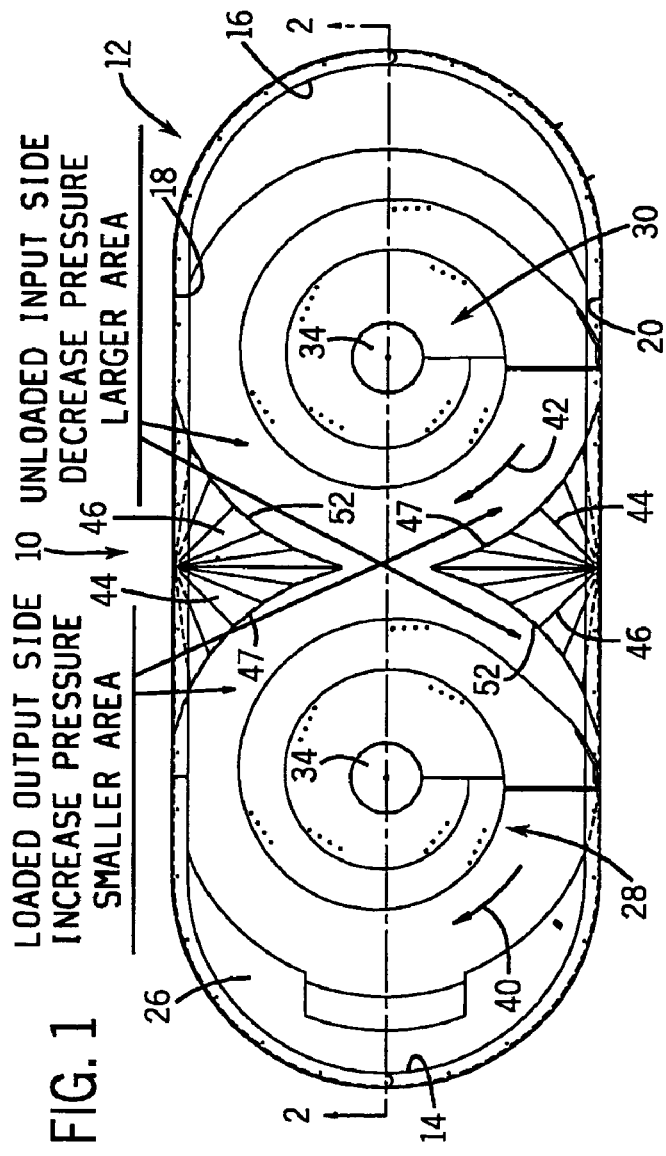
FIG. 1 is a plan view of a vertical agricultural mixer in accordance with the present invention.
Figure 2:
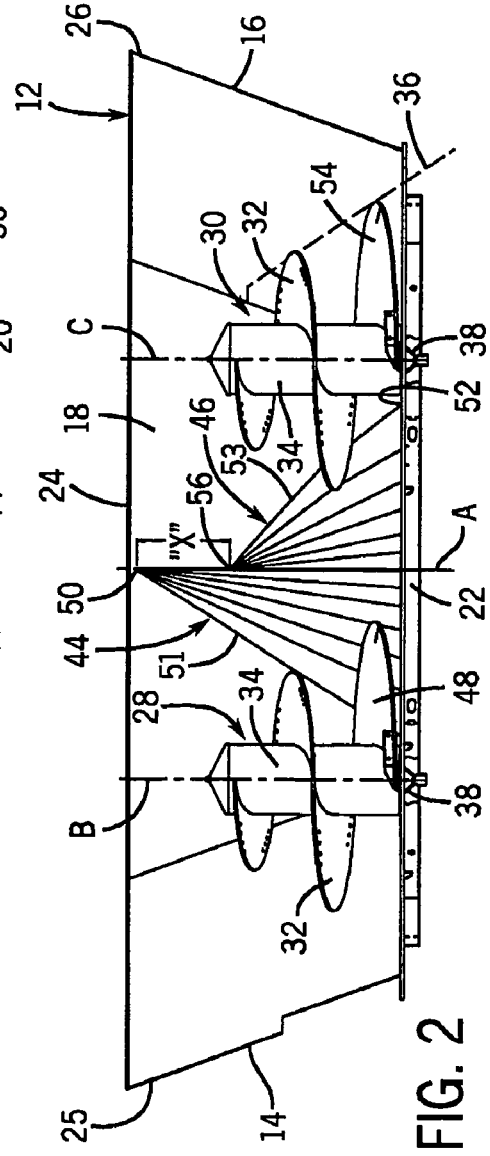
FIG. 2 is a sectional view taken on line 2-2 of FIG. 1.

Referring now to the drawings, FIGS. 1-3 illustrate a vertical agricultural mixer 10 having a generally oval mixing tub 12 defined by upwardly diverging, curved end walls 14, 16, longitudinal vertical sidewalls 18, 20 and a bottom wall 22. The mixing tub 12 also has an open top end 24, a front end 25 and a rearward end 26. As is well known, the mixing tub 12 can be filled from open top end 24 or rearward end 26 with agricultural materials, such as corn, silage and the like intended to be thoroughly mixed together. Within the mixing tub 12, there are a pair of vertical mixing augers 28, 30 which are spaced apart along a longitudinal centerline of the bottom wall 22. Both mixing augers 28, 30 are typically identical in construction with each having upwardly and outwardly sweeping flights 32 fixedly surrounding a rotatable vertical post 34. The edges of auger flights 32 generally follow the path of inclined dotted line 36 shown in FIG. 2. Both mixing augers 28, 30 are normally driven in the same rotational direction by suitable drive means 38 at the lowermost end of the bottom wall 22. In the preferred embodiment, the rotational direction as indicated by arrows 40, 42, is clockwise so that the agricultural material is rotated and lifted upwardly in the mixing tub 12.

Strategically located along middle inner surfaces of each longitudinal sidewall 18, 20 between the outer flight peripheries of the rotatable mixing augers 28, 30, is a pair of asymmetrical, adjacently disposed, half pyramid-shaped transfer protrusions 44, 46. Transfer protrusion 44 has a substantially symmetrical base 47 which is concave and generally follows the contour of the lowest flight 48 of mixing auger 28. The transfer protrusion 44 rises from its base 47 in a tapered fashion to a tip 50 near the top of the mixing tub sidewall 18 at a given angle along a guide surface 51. The transfer protrusion 46 also has a generally symmetrical base 52 which is concave and follows the contour of the lowest flight 54 of mixing auger 30. The transfer protrusion 46 which is away from the approach of rotating mixing auger 28, rises from its base 52 in a tapered fashion along a guide surface 53 at a different, less steep angle than transfer protrusion 44, as best seen in FIG. 2, to a tip 56 located at a lower elevation or height on the tub sidewall 18. In the preferred embodiment, the tips 50, 56 are spaced vertically by a random distance "X" and fall along a common vertical line on sidewall 18 which is coincident with a vertical plane A transversely bisecting the mixing tub 12. Such vertical line is generally parallel to the respective rotational axes B and C of the mixing augers 28, 30. A similar pair of adjacently disposed transfer protrusions 44, 46 is positioned between the outer flight peripheries of mixing augers 28, 30 on the opposite sidewall 20 with the transfer protrusion 44 being located adjacent mixing auger 30, and the transfer protrusion 46 being positioned adjacent mixing auger 28 for a reason to be described below.

In use, when the mixing tank 12 is filled with the agricultural material to be combined, the mixing auger 28 rotates and lifts the material upwardly along guide surface 51 of transfer protrusion 44 on sidewall 18 until the material eventually spills over onto guide surface 53 of adjacent transfer protrusion 46. That is, the asymmetrical nature of the adjacently disposed transfer protrusion 46 allows material to roll or fall away from the action of the mixing auger 28 and the transfer protrusion 44 at a more rapid rate. Material continues to be combined by mixing auger 30 which moves the material to the transfer protrusion 44 on sidewall 20 where the material again replicates the spillage onto adjacently disposed transfer protrusion 46 and brings the mixed material back to the mixing auger 28 for further mixing. The transfer protrusions 44, 46 permit material to continuously transfer to the adjacent mixing auger 28 or 30 more efficiently which improves the mixing action and speeds emptying of the mixer tank 12 which can be unloaded from the front end 25, the rearward end 26 or either of the sidewalls 18, 20 thereof.

It is a key feature of the invention to maintain or increase the pressure in the loaded output side of the auger 28 or 30 against the transfer protrusion 44, and to reduce or drop the pressure in the unloaded input side of the auger 28 or 30 away from the transfer protrusion 46 while preventing dead, inactive or void mixing spots at the base 47 or 52 of the transfer protrusion 44 or 46 in the area bounded by the sidewall 18 or 20 and the peripheries of the mixing augers 28, 30. A pressure gradient created between the adjacently disposed transfer protrusions 44, 46 substantially minimizes any flow of material from mixing auger 28 over transfer protrusion 46 on sidewall 20 against the flow of material being transferred from mixing auger 30 over transfer protrusion 44. Similarly, there is minimal flow of material from mixing auger 30 over transfer protrusion 46 on sidewall 18 against the flow of material being distributed from mixing auger 28 over transfer protrusion 44. It should be appreciated that the size and shape of the transfer protrusions 44, 46 can be a variety of shapes and sizes to accommodate different sizes of mixers 10 while maintaining the advantages stated above.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. In a vertical agricultural mixer having a mixing tub defined by a pair of opposing end walls, first and second opposing sidewalls, a bottom wall and an open top, and first and second vertical mixing augers mounted in the mixing tub and rotatably driven in the same direction therein for lifting and mixing agricultural materials together within the mixing tub, the improvement comprising:

first and second agricultural material-engaging transfer protrusions adjacently disposed along each opposed sidewall between the mixing augers in the mixing tub, the transfer protrusions having asymmetrical, upwardly tapering shapes with tips that are vertically spaced from each other and lie along a common vertical line on each of the sidewalls to permit agricultural material to continuously and more efficiently transfer between the rotating mixing augers in order to improve mixing action in the tub.

2. The improvement of claim 1, whereby, during mixing, pressure is increased in a loaded output side of the first mixing auger against the one transfer protrusion closest thereto, and pressure is reduced in an unloaded input side of the second mixing auger away from the other transfer protrusion while preventing dead mixing spots on bottom ends of the transfer protrusions.

3. The improvement of claim 2, whereby a pressure gradient is created between the adjacently disposed first and second transfer protrusions that substantially minimizes flow of material from the first mixing auger over the second transfer protrusion on the second sidewall against the flow of material being transferred from the second mixing auger over the first transfer protrusion, and that substantially minimizes flow of material from the second mixing auger over the second transfer protrusion on the first sidewall against the flow of material being distributed from the first mixing auger over the first transfer protrusion.

4. A vertical agricultural mixer for combining and mixing various agricultural materials, the mixer comprising:
   a mixing tub defined by a pair of opposing first and second end walls, a pair of opposing first and second sidewalls, a bottom wall and a open top;
   first and second vertical mixing augers adjacently mounted for rotation in the same direction on the mixing tub bottom wall for lifting and mixing agricultural materials, the augers having outwardly and upwardly sweeping flights surrounding vertical posts; and
   a pair of agricultural material-engaging transfer protrusions adjacently disposed along the first and second sidewalls between the mixing augers in the mixing tub, each pair of transfer protrusions having asymmetrical, upwardly tapering shapes with tips that are vertically spaced from each other and lie along a common vertical line on each of the sidewalls, a first transfer protrusion on the first sidewall having a concave base following a contour of a lowest flight of the first mixing auger and rising to the tip at a given angle along a first guide surface, a second transfer protrusion on the first sidewall having a concave base following a contour of a lowest flight of the second mixing auger and rising to the tip along a second guide surface lying at a given angle which is different and less steep than the angle of the first guide surface on the first transfer protrusion, a third transfer protrusion on the second sidewall similar to the first transfer protrusion and located adjacent the second mixing auger, and a fourth transfer protrusion on the second sidewall similar to the second transfer protrusion and located adjacent the first mixing auger.

5. The mixer of claim 4, wherein each transfer protrusion has a half pyramid shape.

6. The mixer of claim 4, wherein the common vertical line on each sidewall is coincident with a vertical plane transversely bisecting the mixing tub.

7. The mixer of claim 4, wherein the tips of the second and fourth transfer protrusions are positioned below top ends of the vertical post of the mixing augers.

* * * * *